United States Patent [19]
Thau et al.

[11] Patent Number: 6,030,105
[45] Date of Patent: Feb. 29, 2000

[54] INTERIOR LIGHTING UNIT FOR VEHICLES

[75] Inventors: Wolfgang Thau, Gevelsberg; Thomas Hempel, Steinheim, both of Germany

[73] Assignee: Donnelly Corporation, Holland, Mich.

[21] Appl. No.: 08/985,924

[22] Filed: Dec. 5, 1997

[30] Foreign Application Priority Data

Jan. 21, 1997 [DE] Germany ................ 296 21 162 U

[51] Int. Cl.$^7$ ................ B60Q 1/06; B60Q 1/26
[52] U.S. Cl. ............ 362/488; 362/490; 362/802; 340/602; 340/604; 340/468
[58] Field of Search ................ 362/488, 490, 362/249, 252, 544, 251, 540, 276, 802, 287, 427; 340/602, 604, 468

[56] References Cited

U.S. PATENT DOCUMENTS

| | | | |
|---|---|---|---|
| 4,628,417 | 12/1986 | Kaminski et al. | 362/74 |
| 4,777,569 | 10/1988 | Wen | 362/80 |
| 4,851,970 | 7/1989 | Bronder | 362/66 |
| 4,896,136 | 1/1990 | Hotovy | 340/468 |
| 5,598,146 | 1/1997 | Schroder | 340/602 |
| 5,780,719 | 7/1998 | VanDam | 340/602 |

FOREIGN PATENT DOCUMENTS

| | | |
|---|---|---|
| 8107034 U | 8/1981 | Germany . |
| 8113359 U | 8/1981 | Germany . |

OTHER PUBLICATIONS

European Search Report for European Patent Application No. 97 121 455.6 of Mar. 1, 1999.

German Search Report for Utility Model Application No. 296 21 162.1, Jul. 21, 1997.

*Primary Examiner*—Thomas M. Sember
*Attorney, Agent, or Firm*—Van Dyke, Gardner, Linn & Burkhart, LLP

[57] ABSTRACT

Disclosed is an interior space lighting unit for a car having a housing including a lower side and an upper side. The lower side is provided with a lower window behind which a first lamp is arranged, and the upper side is provided with an upper window behind which a second lamp is arranged. A switch is coupled to the current supply circuit for the lamps and is mounted to the housing. The housing is adapted to be mounted to a tiltable support such as the rear window on a vehicle tailgate, for illuminating the passenger or luggage space in case the tailgate is closed, or the loading area and/or luggage space in case the tailgate is open.

22 Claims, 1 Drawing Sheet

INTERIOR LIGHTING UNIT FOR VEHICLES

FIELD OF THE INVENTION

The invention concerns an interior space lighting unit for a vehicle, having a housing with a lower side having a light and an upper side having a light. Optionally, the lighting unit may include a brake light and various sensors on a third, rearwardly facing side.

BACKGROUND OF THE INVENTION

A conventional interior lighting unit may be placed within the rearward portion of a vehicle for illuminating the space in front of it, i.e., primarily for the passengers sitting upon the rearward seats of the car. When loading the luggage area or trunk, it is also desirable to obtain an illumination of the luggage area, or of the loading area of a station wagon. Therefore, additional lamps are necessary for these purposes. However, prior lighting units have failed to provide appropriate lighting for all such areas in a single unit.

SUMMARY OF THE INVENTION

It is, therefore, an object of the invention to improve the illumination of the rearward portion of a vehicle.

According to the invention, an interior space lighting unit has a housing which includes a first lamp mounted behind a lower window of the lower side and which includes a second lamp mounted behind an upper window of the upper side of the housing. A three-position-switch is provided within a current supply circuit for the lamps within the housing. The housing is adapted to be mounted to a tiltable support such as the rear window of a pivotable tailgate or rear hatch cover of a vehicle. Due to the three-position-switch, preferably only one of both lamps is coupled to the current supply circuit at a time. Thus, the first lamp may emit light substantially forwardly if the support of the housing assumes a first position, while the second lamp may illuminate the luggage area or trunk, or the loading area completely if the support of the housing assumes a second position tilted with respect to the first position. Alternately, both lamps may be connected to operate simultaneously in which case additional areas of the vehicle are illuminated.

In a preferred embodiment of the invention, the housing has a mounting side which is neither the lower side nor the upper side and by which it may be mounted to a tiltable window, for instance the rearward window of the vehicle, e.g., by bonding to the window. This embodiment results in a simplified construction because special means at the roof of the vehicle for mounting the housing of the lighting unit are obviated. Preferably, the three-position-switch is responsive to the tilting position of the housing support and may be implemented, e.g., by a mercury switch.

According to a further aspect of the invention, the housing may be designed such that further components may be accommodated therein which otherwise are mounted at various different positions within the vehicle. Thus, the mounting side facing rearwardly when the vehicle tailgate or rear window is closed may be provided with a first opening within which a third brake light of the vehicle may be arranged. The mounting side further may be provided with a second opening within which a rain sensor may be arranged for controlling a wiper motor for the window. The mounting side may also be provided with a third opening within which a light sensor may be arranged for controlling an electrochromic interior rearview mirror of the vehicle and/or the sun roof and/or a visual cover blind.

As will now be understood, the housing of the interior space lighting unit may be regarded as an illuminating module including various functions and resulting in a composite package of electrical components which minimizes the number of electric supply lines. Moreover, it is easy to connect the housing to an electric bus or circuit already present within the vehicle. If the material of the housing from which it is made is selected to be electrically conductive, e.g., a metal, all electric components integrated within the housing may be shielded and electrically grounded simultaneously. The position of the interior space lighting unit within the glass area wiped free by the rearward window wiper assures proper functional conditions for sensors, lamps, camera and so on. Such a camera may be mounted behind a further opening of the mounting side of the housing and may be made in a CCD-embodiment and informs the driver concerning conditions behind the vehicle. Another option is a integrated sensor for inspecting the space or blind spot behind the vehicle which is otherwise not visible to the driver.

BRIEF DESCRIPTION OF THE DRAWINGS

A preferred embodiment of the invention is described hereinafter with reference to the accompanying drawings which show.

DETAILED DESCRIPTION OF THE PREFERRED EMBODIMENTS

Figure 1:
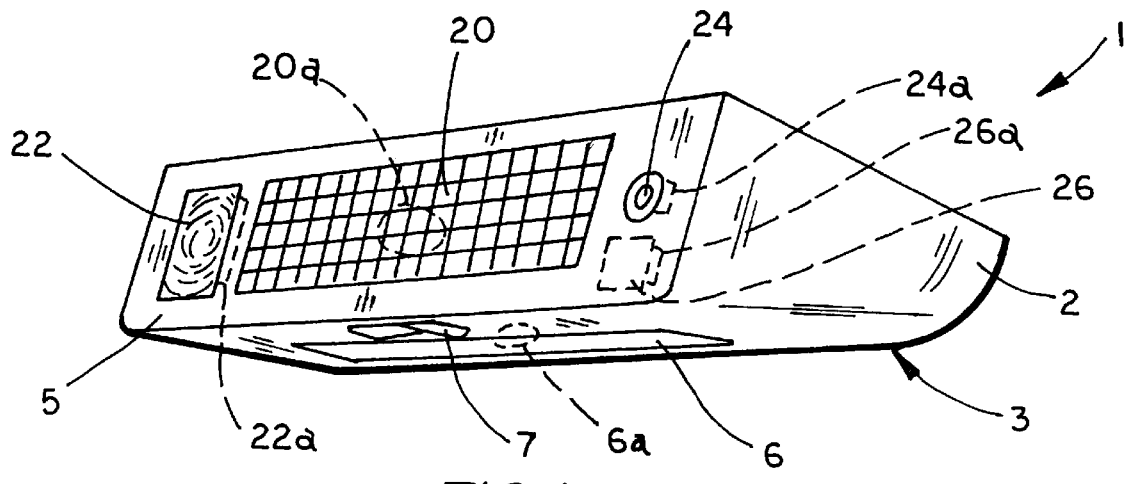
FIG. 1 is a perspective view of a housing for an interior space lighting unit at an angle from below.

The interior space lighting unit, designated as a whole by 2, has a housing 1 of appealingly enameled metal which is coupled to the mass of the vehicle for shielding and electrical grounding purposes. Alternately, the housing 1 may be made of plastic material.

The housing 1 has a substantially planar lower side 3 and an opposite, substantially planar upper side 4. The lower side 3 is inclined relative to upper side 4 such that housing 1 tapers slightly when proceeding from mounting side 5 connected to upper side 4 and to lower side 3.

A lower window 6 is inserted into lower side 3 behind which a lamp 6a is mounted. A three-position-switch 7 is mounted to lower side 3 which may be manipulated by hand.

Figure 4:
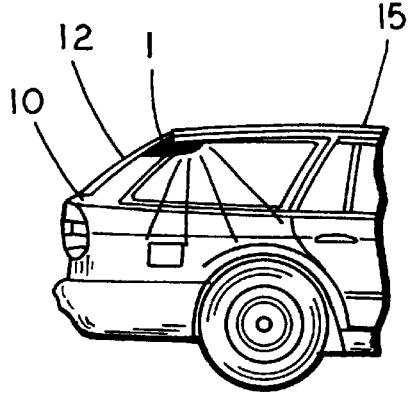
FIGS. 3 and 4 are schematic representations for explaining the functional positions of the internal space light unit.
Figure 3:
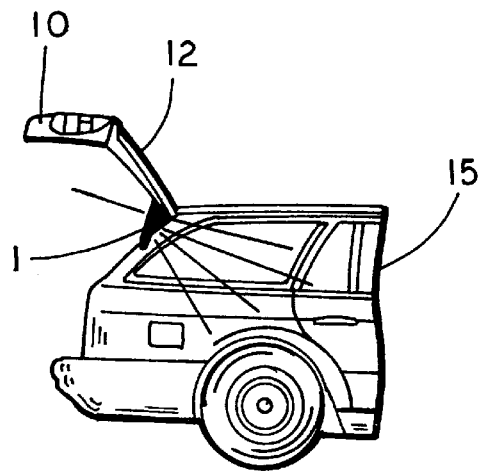
Figure 2:
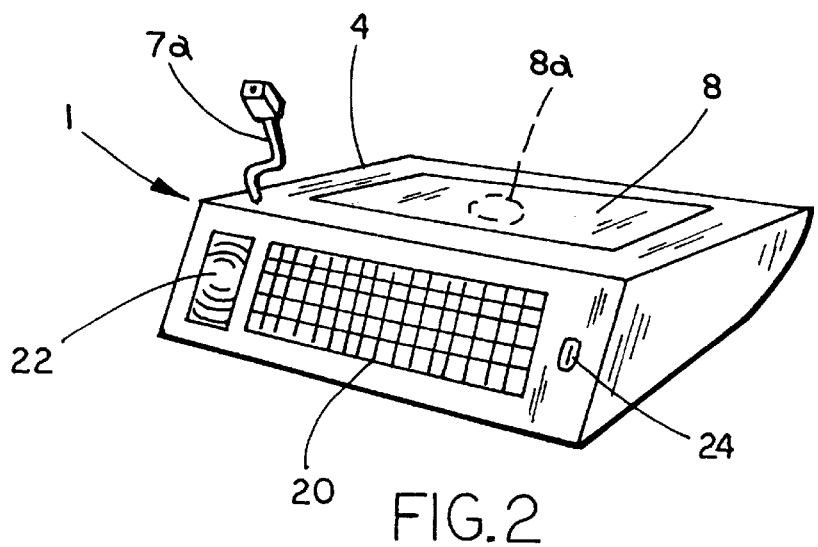
FIG. 2 is a perspective view of a housing according to FIG. 1 at an angle from above.

An upper window 8 is mounted within upper side 4 behind which a second lamp 8a is mounted. Both lamps 6a and 8a are connected to the electrical supply circuit of the vehicle and three-position-switch 7 is connected to the current supply circuit 7a for the lamps. Mounting side 5 may be made planar or bent or inclined with respect to the upper side 4 such that it corresponds to and adapts to the slope or form of the rearward window 12 such that housing 1, having mounting side 5, may be bonded to the inner surface of the rearward window 12 of the rear flap or tailgate or rear hatch cover 10 according to FIGS. 3 and 4, especially within the middle portion of the upper rim of rearward window 12.

If tailgate 10 is closed (FIG. 4) and a door of vehicle 15 is open, three-position-switch 7 should be placed in a position wherein first lamp 6a is coupled to the vehicle electrical supply circuit. First lamp 6a then illuminates according to FIG. 4 the front portion of the loading area or luggage compartment of the car 15. Lower side 3 may be inclined to such extent that first lamp 6a directs the light emitted therefrom forwardly to a great extent in the direction to the passengers sitting on the rear seats. In case tailgate 10 is open (FIG. 3) and three-position-switch 7 is thrown over, second lamp 8a is supplied by current from the vehicle electrical supply circuit and illuminates then the entire loading area or luggage compartment of car 15. Normally, in such position, first lamp 6a remains switched off.

Instead of the hand operated switch 7 another switch may be connected to the electrical supply current circuit for the first and the second lamps. Such an alternate switch preferably responds to the tilted position of housing 1, and to this end, may be a mercury switch. Such a switch provides automatically for a supply current only for first lamp 6a if tailgate 10 is closed, and to the second lamp 8a if tailgate 10 is open.

Of course, it is within the scope of the invention to design switch 7 in such a way that first lamp 6a and second lamp 8a are both supplied with electric current in case the tailgate 10 is open, in which situation first lamp 6a also illuminates the space behind the car (FIG. 3), while second lamp 8a illuminates the rear interior of the vehicle.

Housing 1 may accommodate further functional components. Thus, mounting side 5 includes a large, central first opening 20 behind which a third brake light 20a is mounted. The mounting side has a second opening 22 beside the first opening behind which a rain sensor 22a is mounted for controlling a wiper motor for the rear window 12. Further, mounting side 5 may have a third opening 24 behind which a light sensor 24a is mounted. Such light sensor 24a may control an electrochromic interior rearview mirror for dimming in case the front lights of a following car are too bright or provide glare. In an alternative or as a supplement, light sensor 24a may also control the light transmission of an electrochromic sun roof of the car.

Another opening 26 in mounting side 5 may be provided for a camera 26a, preferably in CCD embodiment, for presenting information to the driver about the space behind the car, which may serve, e.g., as a parking aid. A further option comprises a further sensor within housing 1 for inspecting the invisible area or blind spot behind the car.

It will be understood that the various openings of housing 1 may be closed by clamping flaps in case the above explained optional components are not desired.

The embodiments of the invention in which an exclusive property or privilege is claimed are as follows:

1. In an interior space lighting unit for vehicles including a housing having a lower side and an upper side, the improvement comprising said lower side having a lower window behind which a first lamp is arranged, said upper side having an upper window behind which a second lamp is arranged, and an electrical switch coupled to an electrical current supply circuit for the lamps mounted within said housing, said housing adapted to be mounted to a tiltable support on the vehicle whereby when said housing is in a first position on the tiltable support, said first lamp will illuminate a first area of the vehicle, and when said housing is in a second position on the tiltable support, said second lamp will illuminate the first area of the vehicle and said first lamp will illuminate a second area of the vehicle;

said lighting unit further including at least one of a rain sensor for controlling a wiper motor for a window on the vehicle, a light sensor for detecting light levels, and a camera for presenting information to the driver of the vehicle.

2. The lighting unit of claim 1 wherein said housing includes a mounting side which is neither said lower side nor said upper side of the housing, said housing adapted to be mounted to the tiltable support by said mounting side.

3. The lighting unit of claim 2 wherein the vehicle includes a rear window, said housing being bonded to the rear window by said mounting side.

4. The lighting unit of claim 3 wherein said mounting side includes a first opening, said housing including a third brake lamp for the vehicle adjacent said first opening.

5. The lighting unit of claim 4 wherein said mounting side includes a second opening adapted to accommodate said rain sensor which controls a wiper motor for the rear window.

6. The lighting unit of claim 5 wherein said mounting side includes a third opening adapted to accommodate said light sensor for controlling the light transmission of at least one of an electrochromic rearview mirror, a sun roof, and a visual cover blind of the vehicle.

7. The lighting unit of claim 2 wherein said mounting side includes an opening for said camera, said camera providing information to the driver of the vehicle concerning the space behind the vehicle.

8. The lighting unit of claim 7 wherein said camera is a CCD embodiment.

9. The lighting unit of claim 1 wherein said electrical switch is responsive to the tilted position of said housing whereby said first lamp is operated in the first position, and at least said second lamp is operated in the second position.

10. The lighting unit of claim 9 wherein said electrical switch is responsive to operate said first and second lamps in the second position.

11. The lighting unit of claim 9 wherein said electrical switch is a mercury switch.

12. The lighting unit of claim 1 wherein said camera is mounted on said housing to provide information to the vehicle driver concerning the space behind the vehicle.

13. The lighting unit of claim 12 wherein said camera is a CCD embodiment.

14. An interior lighting unit for a vehicle having a tiltable rear window and a brake system, said lighting unit comprising:

a housing having three sides including a first side having a first opening and a first lamp adjacent to said first opening, a second side having a second opening and a second lamp adjacent said second opening, a third side having a third opening and a third lamp adjacent thereto, and an electrical switch connected to said first and second lamps to control operation thereof, said third lamp adapted to be connected to the vehicle brake system for operation as a brake light;

said housing adapted to be mounted to the tiltable rear window of the vehicle whereby when said housing is in a first position on the tiltable rear window, said first lamp will illuminate a first area of the vehicle, and when said housing is in a second position on the tiltable rear window, said second lamp will illuminate the first area of the vehicle and said first lamp will illuminate a second area of the vehicle;

said lighting unit further including at least one of a rain sensor for controlling a wiper motor for a window on the vehicle, a light sensor for detecting light levels, and a camera for presenting information to the driver of the vehicle.

15. The lighting unit of claim 14 wherein said third side also includes a fourth opening adapted to accommodate a sensor selected from the group consisting of said rain sensor and said light sensor.

16. The lighting unit of claim 14 wherein said electrical switch is responsive to the tilted position of said housing whereby said first lamp is operated in the first position, and at least said second lamp is operated in the second position.

17. The lighting unit of claim 16 wherein said electrical switch is responsive to operate said first and second lamps in the second position.

18. The lighting unit of claim 16 wherein said electrical switch is a mercury switch.

19. The lighting unit of claim 14 wherein said third side includes an opening for said camera, said camera providing information to the driver of the vehicle concerning the space behind the vehicle.

20. The lighting unit of claim 19 wherein said camera is a CCD embodiment.

21. The lighting unit of claim 14 wherein said camera is mounted on said housing to provide information to the vehicle driver concerning the space behind the vehicle.

22. The lighting unit of claim 21 wherein said camera is a CCD embodiment.

* * * * *